United States Patent [19]
Schultz

[11] 3,846,544
[45] Nov. 5, 1974

[54] SPARINGLY-SOLUBLE KALLIKREIN-INACTIVATOR DERIVATIVE AND PROCESSES INVOLVING SAID DERIVATIVE

[75] Inventor: Fritz Schultz, Wuppertal-Sonnborn, Germany

[73] Assignee: Farbenfabriken Bayer Aktiengesellschaft, Leverkusen, Germany

[22] Filed: May 19, 1970

[21] Appl. No.: 38,696

Related U.S. Application Data

[63] Continuation-in-part of Ser. Nos. 257,758, Feb. 11, 1963, abandoned, and Ser. No. 356,978, April 2, 1964, abandoned, and Ser. No. 607,670, Jan. 6, 1967, abandoned.

[52] U.S. Cl................ 424/95, 424/103, 424/104, 424/106, 424/110
[51] Int. Cl............................................ A61k 17/00
[58] Field of Search............ 424/95, 103, 106, 110, 424/104

[56] References Cited
OTHER PUBLICATIONS

Gardner et al., Am. Jour. of Physiology 142:4 pp. 541–543 Nov. 44.
Chemical Abstracts 59:10412a (1963).

Primary Examiner—Jerome D. Goldberg
Assistant Examiner—Vincent D. Turner
Attorney, Agent, or Firm—George A. Depaoli; William E. O'Brien

[57] ABSTRACT

A sparingly soluble derivative of kallikrein-inactivator and metaphosphoric acid or metaphosphoric acid salts are prepared. The method may also be used as part of a purification procedure for impure kallikrein-inactivator solutions.

2 Claims, 1 Drawing Figure

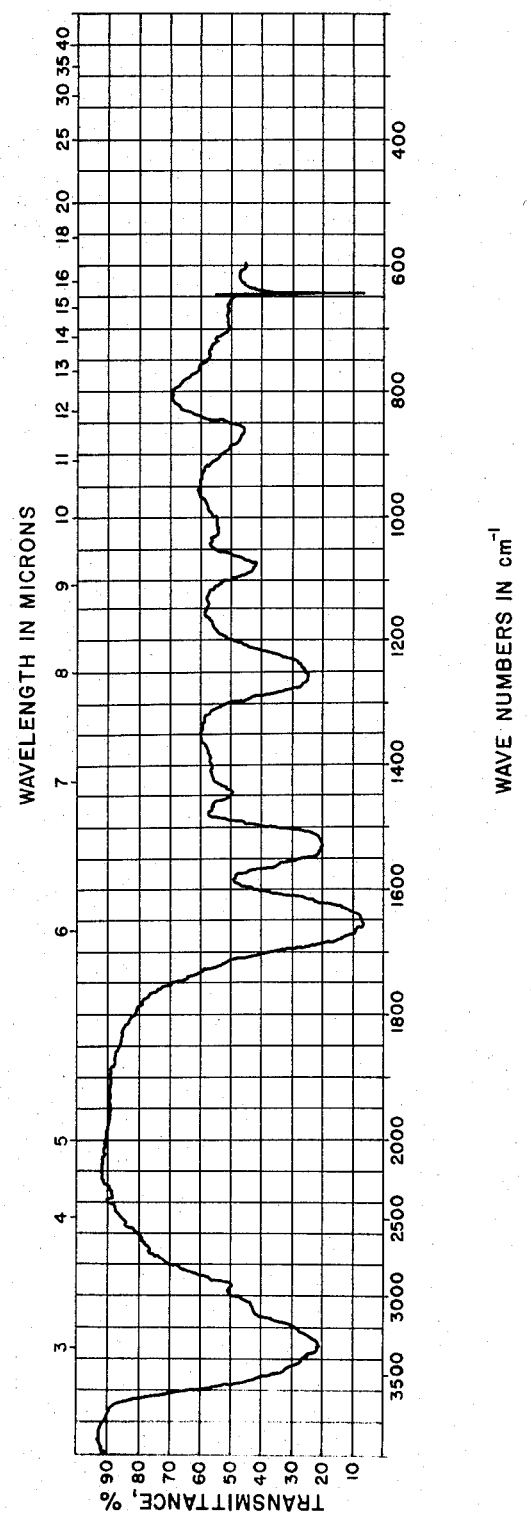

SPARINGLY-SOLUBLE KALLIKREIN-INACTIVATOR DERIVATIVE AND PROCESSES INVOLVING SAID DERIVATIVE

This application is a continuation-in-part of my co-pending applications Ser. No. 257,758, filed Feb. 11, 1963, Ser. No. 356,978, filed Apr. 2, 1964, and Ser. No. 607,670, filed Jan. 6, 1967 (all abandoned).

This invention relates to a novel derivative of the inactivator for the circulatory hormone kallikrein, to a process for the production of this pharmaceutically useful, sparingly soluble, derivative of the kallikrein-inactivator (KI), and to a process which uses this derivative as an intermediate. Kallikrein itself is a substance found in the bodies of mammals, which, it has been found, serves to dilate the peripheral arterial vessels, and the mechanism by which kallikrein does this has been found to be a proteolytic process. Kallikrein-inactivator is a different substance which inhibits the activity of kallikrein and certain other protein-splitting enzymes. For this reason kallikrein-inactivator is useful in certain control, preventative, pre- and/or post-operative treatments of certain diseases where body organs themselves are attacked by protein-splitting enzymes (proteases). Such a disease is acute pancreatitis, wherein the pancreas itself is attacked, apparently by the digestive enzymes which it produces. The use of KI in therapy is discussed in the literature, for example by R. Bedacht in *Arztl. Prax.*, volume 12, page 371 (1958); J. Kirsch in *Med. Welt* (1960), page 2719; and K. Veiel in *Clinical Excerpts*, volume 22, No. 1 (1961), published by Farbenfabriken Bayer AG, Leverkusen, Germany.

Kallikrein-inactivator was first prepared by H. Kraut, E. K. Frey and E. Werle by extracting certain dried organs of mammals with water or dilute acetic acid and by precipitating the inactivator from these extracts by the addition of ethanol [F. F. Hoppe-Seylers *Z. Physiol. Chem.* volume 192, page 1 (1930)]. Such organs include the lymph glands and the parotid glands as well as the lung, pancreas, liver and spleen. It has been further shown that albumin-free derivatives of the kallikrein-inactivator can be prepared from such animal organs, including glands, by treating solutions, through the addition of albumin-precipitating agents, such as sulfosalicylic acid and trichloracetic acid, whereby these protein-specific agents do not precipitate the KI, but rather, function selectively to free the solution of the albumin or protein impurities (see German Pat. No. 1,084,433).

The present invention is based, in part, on the discovery that the kallikrein-inactivator can be precipitated directly from its solutions in the form of a sparingly soluble derivative by reactions involving metaphosphoric acid and its water-soluble salts, as, for example, its salts with alkali metals and ammonium. The KI may be precipitated from its aqueous solutions by addition of free metaphosphoric acid to the solution; metaphosphate salts may be added in excess to the KI solution and after slow acidification, a reaction takes place and the derivitive precipitates; metaphosphate salts may be added to a neutral or alkaline KI aqueous solution to produce precipitation of the derivitive without excess of the salt. After completion of precipitation, the unique sparingly soluble derivative of this invention is then separated from the mother liquor.

It has also been discovered that substantially pure preparations of the kallikrein-inactivator can be produced and recovered in high yields by precipitation of the same from its less pure solutions through use of metaphosphoric acid or its water-soluble salts, separating the resulting precipitate, decomposing the precipitate by dissolving it in ammonia, caustic alkali or salt solutions, and freeing the resulting solution from the salts via known techniques, for example, deionization. The effectiveness of metaphosphoric acid salts in respect to this invention is surprising in that it was not heretofore known that water-soluble salts of metaphosphoric acid would form a precipitate with the kallikrein-inactivator, but now it has been found that such a precipitate can be formed even without acidification when an excess of the salt is avoided. In accordance with this invention, suitable watersoluble salts include primarily the alkali-metal and ammonium salts. The possible toxicity of the metaphosphoric acid salts is of little or no significance in the present invention, first because no toxic water-soluble salts of metaphosphoric acid are commercially available and secondly, any toxic cation would not form part of the precipitation product, but rather would remain behind in the acidified mother liquor after precipitation.

It has been found that metaphosphoric acid and its water-soluble salts are specific toward kallikrein-inactivator and may be used upon crude solutions containing albumin and other proteinaceous impurities. Significantly, the precipitation mechanism of the invention also occurs in albumin-free solutions of the kallikrein-inactivator as, for example, solutions which have been initially dealbuminized quantitatively with sulfosalicylic acid or trichloracetic acid, from which it clearly follows that the process of the invention is not related in any way to the standard practices involving precipitation of the albumin or protein.

Furthermore, in accordance with the process of the invention, no denaturation of the kallikrein-inactivator occurs, which further illustrates the fact that the mechanism is independent of albumin precipitation, since such albumin-precipitating mechanisms are generally accompanied by denaturations as indicated by loss in biological activity.

KI, as produced in most commercial processes, is soluble in water and readily soluble in the blood-stream. Therapy using Ki, therefore, ordinarily requires prolonged intravenous feeding of the inactivator. This invention provides a sparingly soluble KI derivative; suspensions of the precipitated product of this invention in water are not dialyzable, whereas the kallikrein-inactivator can be dialyzed in its soluble form and from mixtures. The product of this invention is non-toxic, has a definitively natural affinity for the tissues, and is, therefore, well suited for therapeutic applications, including injection therapy. When injected intramuscularly, this derivative is not all ready to go to work immediately but rather dissolves slowly in the blood stream for a prolonged or depot action. Dosages of the derivative thus will be sufficient to provide known dosages of the kallikrein inactivator.

The product of this invention, on analysis, was found to have the weight percentage of the elements as follows:

Carbon = 40.1

-Continued

| | | |
|---|---|---|
| Hydrogen | = | 5.8 |
| Nitrogen | = | 12.6 |
| Oxygen | = | 30.8 |
| Sulfur | = | 2.7 |
| Phosphorus | = | 6.1 |
| Water | = | 2.0 |

The infrared spectrum of the compound is that shown in the FIGURE in the accompanying drawing.

The infrared spectrum of the product of the invention is illustrated in the FIGURE of the drawing and was performed on a sample thereof by dissolving 0.9 mg. of material in 300 mgs. of potassium bromide. The sample material was in the form of a pellet having a diameter of 13 mm. The infrared spectrum was taken employing a spectrophotometer manufactured by S. Bruckl, Munich.

Infrared (IR) Spectrum

| | |
|---|---|
| Grating | 75 grooves/mm |
| Source Intensity | 3 |
| Gain | 2.5 |
| Suppression | 3 |
| Scanning Speed | 200cm$^{-1}$/min. |

As mentioned, the KI derivative of this invention may also provide a route to purified KI itself, by precipitating the derivative from a crude or other impure KI solution and by decomposition of the precipitate. This latter can be effected by dissolving the same in caustic soda or in salt solutions as, for example, aqueous solutions of NaCL or NH$_4$Cl at concentrations usually of more than 1 percent. Removal of the metaphosphoric acid or of the salts is accomplished by the application of known techniques, e.g., by treating the solutions with ion exchangers or by dialysis, and the like. The process results in the production of almost pure solutions of the kallikrein-inactivator in yields of approximately 80 percent with a purity of 0.16 to 0.19 $\gamma$/KIU. If the resulting solutions are lyophilized a readily water-soluble amorphous substance is obtained.

The process of the invention is applicable for use in conjunction with solutions containing the kallikrein-inactivator which are obtained from homogenized animal organs containing the inactivator. Suitable kallikrein-inactivator-containing animal organs for use in the process of the invention include, for example, liver, lung, pancreas, spleen, submaxillary gland, kidney, stomach, intestine, muscle and skin, as well as the parotid and lymph glands, chiefly of cattle, but also of other ruminants.

This invention will be better understood by reference to the following examples, which are to be considered illustrative only and not limiting.

EXAMPLE I

One-hundred and fourteen milligrams of the kallikrein-inactivator from the lung (0.38 /KIU), corresponding to 300,000 KIU, were dissolved in 5 cubic centimeters of redistilled water, and precipitated with 2.5 cubic centimeters of a 10 percent-metaphosphoric acid solution. The precipitate was isolated by centrifugation, washed three times with redistilled water, and then suspended in 10 cubic centimeters of redistilled water. The suspension was found to contain about 100 percent of the activity of the kallikrein-inactivator.

EXAMPLE II

One-hundred and fourteen milligrams of the kallikrein-inactivator from the lung (0.38$\gamma$/KIU), corresponding to 300,000 KIU, were dissolved in 2.5 cubic centimeters of redistilled water. A 10 percent-metaphosphoric acid solution was adjusted with NaOH to pH 7.5, and 2.5 cubic centimeters of this Na-metaphosphoric acid solution were stirred into the kallikrein-inactivator solution. Upon the addition of 1 cubic centimeter of a glacial acetic acid diluted 1:10, a precipitate formed which was separated by centrifugation. It was washed three times with redistilled water, and was then suspended in 10 cubic centimeters of redistilled water. The suspension was found to contain about 100 percent of the activity of the kallikrein-inactivator.

EXAMPLE III

Three hundred milligrams of kallikrein-inactivator having a degree of purity of 0.6$\gamma$/KIU, corresponding to 500,000 KIU, which had been prepared from the pancreas, were dissolved in 10 cubic centimeters of redistilled water and precipitated with 7.2 cubic centimeters of a 10 percent-metaphosphoric acid. The precipitate was recovered by centrifugation, washed three times with redistilled water, and suspended in 22.5 cubic centimeters of redistilled water. The yield amounted to 90 percent and, hence, 1 cubic centimeter of the suspension contained 20,000 KIU.

EXAMPLE IV

One-hundred cubic centimeters (100 cc.) of a salt-free aqueous solution of kallikrein-inactivator from the parotid gland, having a degree of purity of 0.42$\gamma$/KIU and containing 250,000 KIU, were precipitated with 0.2 cubic centimeter of a 10 percent-metaphosphoric acid. The precipitate was isolated by centrifugation, washed twice with redistilled water, and the residue was then suspended in 20 cubic centimeters of redistilled water. One cubic centimeter of the suspension contained 11,250 KIU, the yield amounting to 90 percent.

EXAMPLE V

One-hundred and fifty cubic centimeters of a salt-free aqueous solution of kallikrein-inactivator from the lung, having a degree of purity of 0.3$\gamma$/KIU and containing 9.9 million KIU, were precipitated with 10 cubic centimeters of a 10 percent-metaphosphoric acid solution. The precipitate was recovered by centrifugation and washed twice with redistilled water. The residue was then suspended in 300 cubic centimeters of redistilled water, and dissolved with agitation in 2.25 cubic centimeters of a 1N-caustic soda solution (pH 7.5). This solution was run through an ion-exchange column into which had been packed 70 cubic centimeters of a cation exchanger (Levatit S 100 or Amberlite IR 120-Tradenames), and 220 cubic centimeters of an anion exchanger (Amberlite IRA 410 — Tradename).

Out of this column flowed a salt-free solution of pH 9.4. It was rewashed with 120 cubic centimeters of redistilled water. In all, there were obtained 430 cubic centimeters which were neutralized with 3 cubic centimeters of a 1N-hydrochloric acid solution. The solution contained 8,524 million KIU = 86 percent of the amount used, having a degree of purity of 0.16γ/KIU. The product, which contains 20,000 KIU/cc. and is free from phosphiric acids, was lyophilized.

EXAMPLE VI

Three hundred milligrams of a lyophilized inactivator preparation from pancreas having a degree of purity of 0.6γ/KIU corresponding to 500,000 KIU are dissolved in 25 cubic centimeters of redistilled water and precipitated by addition of 14.4 cubic centimeters of a 5 percent-metaphosphoric acid. The precipitate is recovered by centrifugation, washed twice with 40 cubic centimeters of redistilled water and suspended in 50 cubic centimeters of redistilled water. Thereupon there are added, while stirring, so much N/10-caustic soda solution that the precipitate is just dissolved. This occurs at a pH of 8–9. The solution is run through an ion-exchange column containing 5 cubic centimeters of the cation exchanger Amberlite IR 120 and 20 cubic centimeters of the anion exchanger Amberlite IRA 410. No more than 10 drops run out per minute. Finally the column is washed with 25 cubic centimeters of redistilled water.

The combined solutions contain 380,000 KIU which corresponds to a yield of 76 percent. The degree of purity is 0.19γ for 1 KIU.

EXAMPLE VII

One hundred litres of a kallikrein-inactivator preparation obtained from pancreas which contains 2,500 KIU per cubic centimeter of a degree of purity of 0.65, in all, 250 million KIU, are precipitated while stirring with 220 cubic centimeters of a 10 percent-metaphosphoric acid solution. The precipitate is recovered, washed twice with 17 litres of redistilled water and suspended in 7 litres of redistilled water. The suspension is dissolved by addition of 39 cubic centimeters of 1N.-caustic soda solution. Each cubic centimeter of the weakly viscous solution now contained 35,000 KIU. The precipitation thus was quantitative.

The solution is now allowed to pass through two ion-exchange columns, one of which contains 6.6 litres of the anion exchanger Amberlite IRA 410, the other 2.2 litres of the cation exchanger Levatit S 100 or Amberlite IR 120. The columns are washed with 5 litres of redistilled water. The solution which drops out of the column is salt-free. It is brought to a pH of 6.0 by addition of N/1-hydrochloric acid. The solution amounts to 12 litres, containing 210 million KIU, i.e., 84 percent of the original amount. One cubic centimeter contains 17,500 KIU of a degree of purity of 0.16γ. After lyophilization the solution yields 33.6 grams of kallikrein-inactivator.

EXAMPLE VIII

Kallikrein-inactivator, in amount of 1.080 grams of purity 0.54γ/KIU, was dissolved in 40 cubic centimeters of redistilled water and precipitated with 1.3 cubic centimeters of a 10 percent sodium metaphosphate solution which had been adjusted with a caustic soda solution to a pH value of 11.0. The precipitate was separated by centrifuging, washed with 10 cubic centimeters of redistilled water and, following another centrifuging, suspended in 100 cubic centimeters of redistilled water. It was then dissolved, with stirring, with 5 cubic centimeters of N/10 caustic soda. The resulting solution was then caused to flow through an exchanger column furnished with 15 cubic centimeters of a cation exchange resin (Levatit S 100 or Amberlite IR 120) and 45 cubic centimeters of an anion exchanger (Amberlite IRA 410).

The solution recovered from the exchanger column was found to contain 1.6 million KIU of purity 0.18γ/KIU.

What is claimed is:

1. A sparingly soluble reaction product of kallikrein-inactivator with metaphosphoric acid, said product being nontoxic and while in aqueous suspension non-dialyzable and slowly soluble when injected intramuscularly and having a percentage composition of its elements as follows:

| | | |
|---|---|---|
| Carbon | = | 40.1 |
| Hydrogen | = | 5.8 |
| Nitrogen | = | 12.6 |
| Oxygen | = | 30.8 |
| Sulfur | = | 2.7 |
| Phosphorus | = | 6.1 |
| Water | = | 2.0 | and having the infrared spectrum as shown in FIG. 1 of the drawing.

2. A process for the production of a sparingly soluble kallikrein inhibitor as defined in claim 1 comprising dissolving the kallikrein-inhibitor obtained by extraction of animal organs known to contain the same selected from the group consisting of liver, lung, pancreas, spleen, submaxillary gland, kidney, stomach, intestine, muscle, skin, parotid and lymph glands, in distilled water, adding to said solution a member of the group consisting of metaphosphoric acid and the water-soluble alkali metal or ammonium salts of metaphosphoric acid thereby precipitating the desired sparingly-soluble derivative and separating the same from the reaction mixture.

* * * * *